Nov. 3, 1964    H. S. RUBENS ET AL    3,155,761
BORESCOPE
Filed Jan. 12, 1960
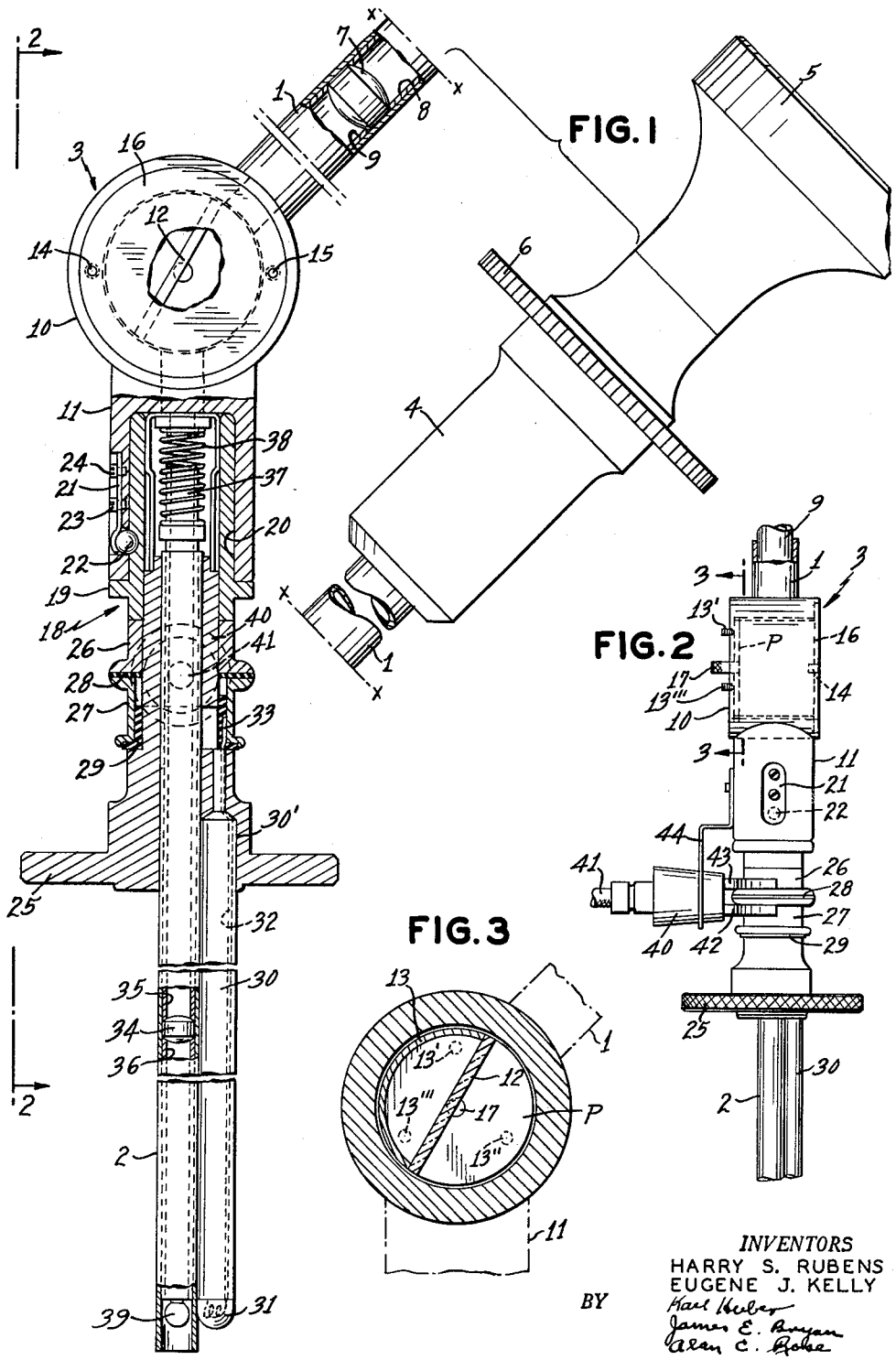
INVENTORS
HARRY S. RUBENS
EUGENE J. KELLY
BY
ATTORNEYS

United States Patent Office 3,155,761
Patented Nov. 3, 1964

3,155,761
BORESCOPE
Harry S. Rubens, Massapequa, and Eugene J. Kelly, Queens Village, N.Y., assignors to Engelhard Hanovia, Inc., a corporation of New Jersey
Filed Jan. 12, 1960, Ser. No. 2,002
2 Claims. (Cl. 88—14)

The present invention deals with a borescope and more particularly with an improved borescope for inspecting bores and cavities which are not easily accessible.

Borescopes are precision-built tubular optical instruments having a light source and an objective lens or prism at one end, and an ocular assembly at the other end, whereby an image formed by the objective lens is transmitted through the borescope tube by a succession of achromatic erector lenses to the ocular assembly where the image is magnified and erected.

A borescope is usually provided in the form of a straight tube and sometimes requires a length of several feet for the inspection of long bores. There are, however, instances where bores are inaccessible to a long straight borescope tube because of interfering structure in the vicinity of the bore opening. For example, in the inspection of engine cylinder walls and valves through spark plug openings, the spark plug openings are inaccessible to long straight bores because of interfering hood or housing structure.

The present invention deals with an angular borescope, i.e. a borescope in the form of an elbow. The term "angular" as herein contemplated refers to the assembled borescope where a pair of tubes are joined together at an angle other than a straight angle.

It is an object of the invention to provide an angular borescope. It is another object of the invention to provide an angular borescope for inspecting bores unaccessible to long straight borescope tubes. Other objects and advantages of the invention will become apparent from the description hereinafter following and the drawings forming a part hereof, in which:

FIGURE 1 illustrates a partly elevational and partly cross-sectional view of the borescope of the invention, FIGURE 2 illustrates an elevational fragmentary view along lines 2—2 of FIGURE 1, and FIGURE 3 illustrates a partly elevational and partly cross-sectional view along lines 3—3 of FIGURE 2.

According to the invention, the borescope comprises an angular borescope formed by a pair of tubular optical systems joined to each other so that their axes intersect.

Regarding FIGURES 1 and 2, the borescope comprises a straight ocular tube 1 and a straight objective tube 2 with a joint 3 connecting the tubes and positioned therebetween. An ocular assembly is positioned at one end of the ocular tube 1 and comprises an optical lens housing 4 having an eyeshield 5 at the free end of the housing, the other end of the housing being connected to the optical tube. A collar 6 is provided on the housing 4 by which the instrument is grasped or held during use. At least one erector lens 7 is positioned in the ocular tube 1 and retained in position between internal sleeves 8 and 9. The other end of the tube 1 is affixed to a joint housing 10 of elbow 3 and communicates with the interior of the joint housing. A tubular extension 11 extends outwardly of the joint housing 10 angularly of the tube 1, the extension communicating with the joint housing interior. An adjustable reflector 12, e.g. a mirror, is supported on a support or mirror mount 13 and the supported reflector is mounted in the joint housing 10 with the reflecting surface of the reflector disposed angularly to the ocular tube axis, and the objective tube axis permitting a line-of-sight through the objective tube, the joint housing, and through the optical tube to the eyepiece 5. Screws 14 and 15 pass through retaining plate 16 to retain the plate in position. A circular plate P is affixed to the mirror mount 13 internally of the joint housing 10 and positioned coaxially of the housing. A screw 17 is fixed to the plate P centrally thereof through the wall of the housing and by which the mirror 12 is adjustable within the housing. Having established the proper setting of the mirror, the mirror is set in position by means of set screws or adjustment screws 13', 13" and 13''' spaced circumferentially of each other at 120° intervals through the wall of the housing and contactable with the plate P as illustrated by FIGURE 3. An end portion of the objective tube 2 is mounted within a tubular head assembly 18 having a peripheral shoulder 19 spaced from an end thereof. The head assembly is inserted into the extension 11 with the shoulder 19 abutting the end of the extension member. The portion of the head assembly which is positioned inside the tubular extension 11 is provided with an annular peripheral groove 20. A hole is formed through the wall of the tubular extension 11 adjacent the annular groove 20. A leaf spring member 21 having a ball member 22 mounted at an end portion thereof is affixed to the outer wall of the tubing extension 11 by means of retaining screws 23 and 24. The ball member is positioned in the hole through the wall of the tubular extension 11 and engages the annular groove 20, whereby the tubular head assembly 18 is rotatable within the extension 11 and retained therein by means of the ball 22 riding in the groove 20. Since the ball member is mounted on the leaf spring 21, the head assembly is easily inserted and removed from the tubular extension 11. A knurled or milled hand wheel or collar 25 is mounted at the other end of the head assembly 18. A pair of electrical contact rings 26 and 27 are coaxially mounted on the tubular head assembly 18 between the shoulder 19 and the hand wheel 25. The electrical contact rings are spaced from each other axially of the head assembly with the contact ring 26 being in electrical contact with the head assembly and the electrical contact ring 27 being insulated both from the contact ring 26 and the head assembly 18.

The contact rings are insulated from each other by means of an insulator gasket 28 positioned therebetween. The ring 27 is further insulated from the head 18 by means of an insulator ring 29 between the ring and the head 18.

An illuminating tube 30 is mounted in a recessed seat 30' in an end of the head assembly and is positioned adjacent to and parallel with the objective tube 2. The end portion of the illuminating tube is provided with a lamp 31 mounted on the tube. An insulated electrical conductor 32 is electrically connected to the ring 27, as at 33, and passes through a portion of the head 18 and into the illuminating tube 30 and is electrically connected to the lamp 31.

At least 1 erector lens 34 is mounted in the objective tube 2 between a pair of sleeves 35 and 36, the sleeves holding the lens in mounted position by means of a plug 37 mounted at the open end of the tube 2 within the extension 11 and holding the sleeves against the lens by spring tension or spring 38 positioned between the plug 37 and the internal walls of the tubular extension 11. An objective lens 39 is positioned inside the free end of the tube 2.

An electrical plug member 30 having a connecting cord 41 leading therein and electrically connected to a pair of semi-circular spring contact arms 42 and 43 mounted in the plug is secured to the external surface of the head assembly 18 by contact arms 42 and 43 each grasping and contacting one of the conductor rings 26 and 27 and is further restrained from rotation by mounting means 44. The lamp 31 is grounded to the illuminating tube 30 which is in electrical contact with the head assembly 11 and the head 11 is in electrical contact with the ring 26 thereby providing a circuit to the two rings 26 and 27.

In operation, the objective tube 2 is inserted into a bore and is rotatably manipulated for inspection by means of the handwheel 25.

Modifications of the invention are contemplated within the scope of the appended claims.

What is claimed is:

1. A borescope comprising a first tube member, ocular means mounted on one end of the first tube member, a second tube member, light transmissive objective means mounted in one end of the second tube member, a housing member, a tubular extension extending outwardly of the housing member and communicating therewith, a tubular head assembly the other end of the first tube connected to and communicating with the housing, the other end of the second tube mounted in the tubular head assembly, the tubular head assembly being rotatably mounted in the tubular extension, means for detachably mounting the head assembly in the tubular extension, said detachable mounting means comprising a ball detent means coupled to said extension the tubes being positioned angularly of each other and their axes intersecting in the housing, a third tube mounted in said head assembly adjacent to and parallel with the second tube, electric lamp means mounted in an end of said third tube near the objective means of the second tube, a pair of axially-spaced contact rings on said head assembly and mounted externally thereof, electrical circuit means electrically connecting the rings with the lamp, a reflecting means mounted in the housing and positioned to reflect an image from the objective means to the ocular means, and adjustment means on said tubular head assembly for simultaneously rotating the second and third tubes relative to the said tubular extension.

2. A borescope according to claim 1, wherein the reflecting means is mounted on an adjustable mounting, and means communicating through a wall of the housing for adjusting the mounting means to align the reflecting means to reflect an image from the objective means to the ocular means.

References Cited in the file of this patent

UNITED STATES PATENTS

| | | |
|---|---|---|
| 1,551,770 | Palmeter | Sept. 1, 1925 |
| 1,859,682 | Ranstead | May 24, 1932 |
| 2,325,253 | Laging | July 27, 1943 |
| 2,541,976 | Bogart | Feb. 20, 1951 |
| 2,825,265 | Hoffmann | Mar. 4, 1958 |
| 2,906,161 | Thompson | Sept. 29, 1959 |
| 2,987,960 | Sheldon | June 13, 1961 |

FOREIGN PATENTS

| | | |
|---|---|---|
| 489,166 | Great Britain | July 18, 1938 |

OTHER REFERENCES

Bausch and Lomb Optical Co., catalog No. D–1059, Nov. 10, 1956, CH, page 10 cited.